April 2, 1968     R. W. FREYTAG     3,376,558
FERROACOUSTIC MEMORY APPARATUS
Filed Aug. 31, 1964
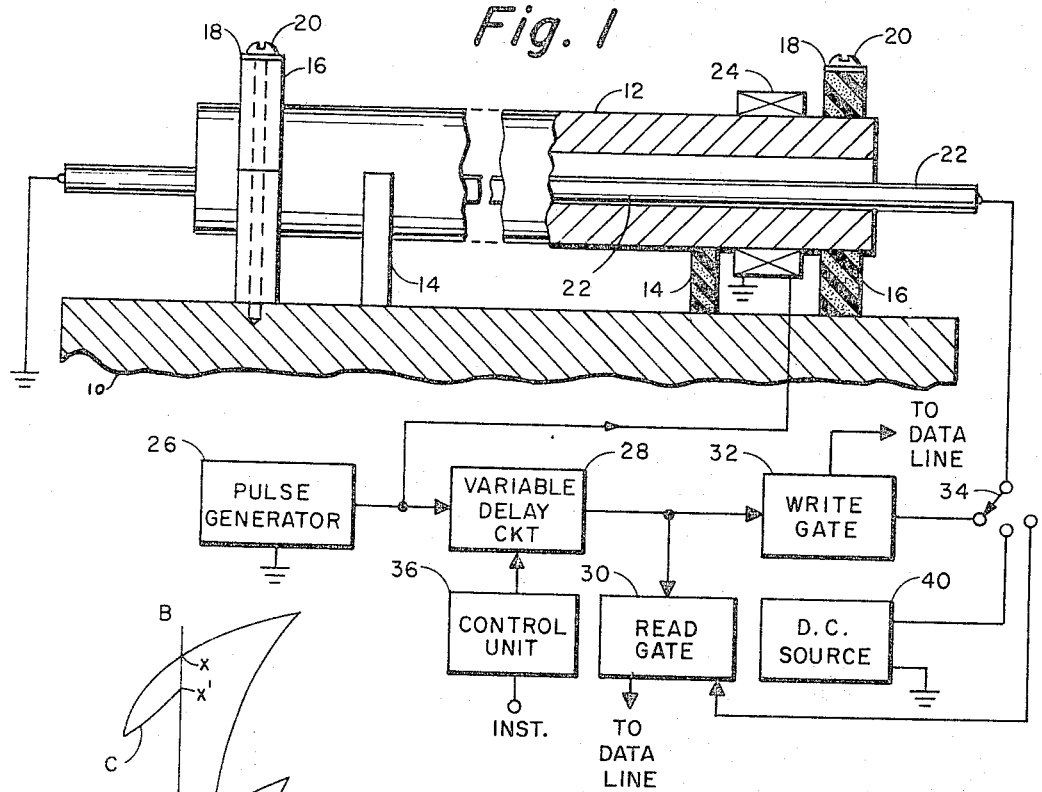
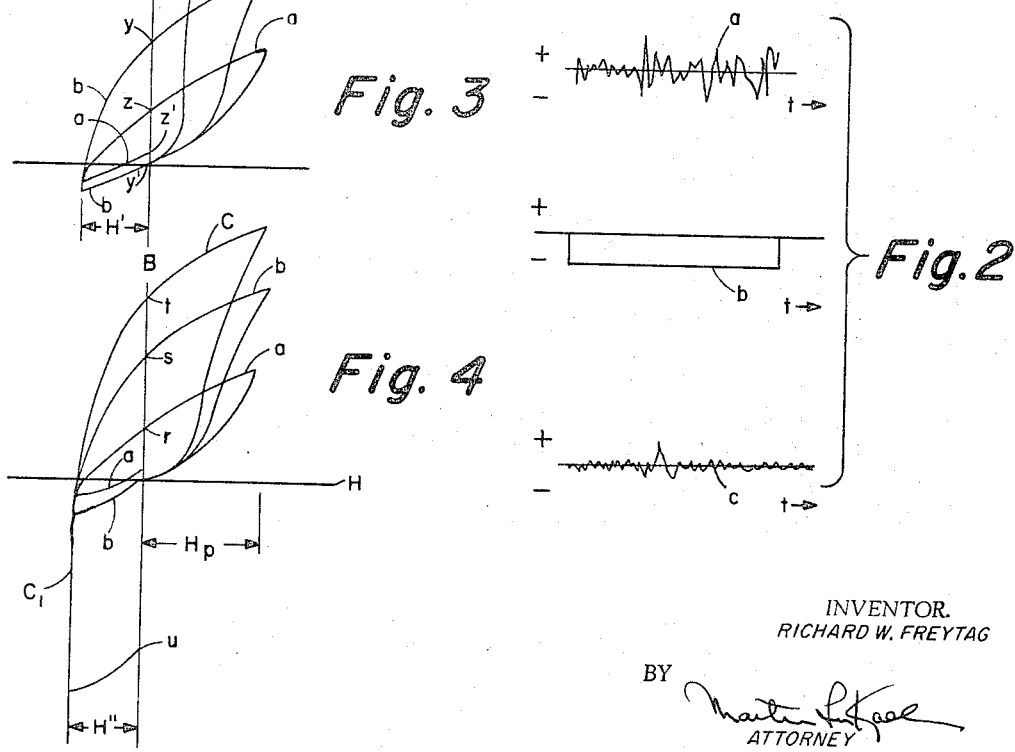
INVENTOR.
RICHARD W. FREYTAG
BY
ATTORNEY

United States Patent Office 3,376,558
Patented Apr. 2, 1968

3,376,558
FERROACOUSTIC MEMORY APPARATUS
Richard W. Freytag, Fairport, N.Y., assignor to General Dynamics Corporation, a corporation of Delaware
Filed Aug. 31, 1964, Ser. No. 393,182
8 Claims. (Cl. 340—173)

ABSTRACT OF THE DISCLOSURE

A ferroacoustic memory apparatus is described wherein the coincident application of stress in a first field causes the storing of information at a precise increment and then the application of a field in a reverse direction to the first field minimizes remanent induction in those increments of the apparatus wherein information is not stored thereby reducing noise during read out.

---

This invention relates to information handling apparatus and particularly to a memory for storing digital data.

The invention is especially suitable for use in apparatus described in application for Letters Patent Serial No. 184,426, filed by Joseph W. Gratian on April 2, 1962, now abandoned, and assigned to the same assignee as this application.

The apparatus described in the Gratian application includes a line of magnetic material having the characteristic of changing its ability to become magnetized in the presence of stress. This line is associated with means for its magnetization. Magnetostrictive material, for example, in the form of a tube may provide the line and a conductor extending along the center of the tube may provide the magnetizing means. A transducer is coupled to the line for generating stress pulses which propagate along the line. To write, a stress pulse is propagated along the line. After a delay which determines the point on the line reached by the stress pulse, a short current pulse is applied to the central conductor. Due to the coincident application of the magnetic field and mechanical stress at the same point on the line, the permeability of the line is enhanced, and the line is magnetized at the point. The magnetized point may represent a stored data element such as a bit, and the location of the point is the address of that bit. To read, a stress pulse is again propagated along the line. After a delay, corresponding to the address of the bit, a gate coupled to the central conductor is enabled momentarily. An electrical pulse representing the bit is induced in the conductor and read out through the gate. In other words, readout results from the movement of the stress pulse between line increments of different strain sensitivity respectively respresenting an unrecorded line portion and the recorded bit. By strain sensitivity is meant the change in induction or flux density which results from a change in stress in the line material. The memory apparatus described above is termed a "ferroacoustic" memory.

The ferroacoustic line may not be entirely uniform. Noise may occur during readout due to variations in outside dimensions, permeability, strain sensitivity and cross-sectional area. For example, the strain sensitivity of the line, on which readout depends, may vary somewhat along the line, due to variations in permeability and cross-sectional area of the line. Such variations in permeability and cross-sectional area can cause variations in the level of remanence of the line when magnetizing current, alone and in the absence of stress, is applied to the central conductor. Since strain sensitivity is a function of remanence, the strain sensitivity of the line and, therefore, the noise in the readout voltage is also dependent upon these remanence variations.

It is an object of the present invention to provide improved information storage apparatus.

It is a further object of the invention to provide an improved ferroacoustic storage apparatus which is compensated for noise on readout.

It is a still further object of the present invention to provide improved methods of information storage with the aid of retentive materials.

It is a still further object of the present invention to provide improved methods of ferroacoustic information storage.

Briefly, described, a system of information storage according to the invention includes a line of retentive material which is also strain sensitive, such for example as magnetostrictive material. Means are provided for propagating a stress pulse along the line and also magnetizing the line in different increments thereof at which the stress pulse is present to record data at such increments. Means are provided for applying sufficient reverse magnetization to minimize any remanent magnetization of non-recorded portions of the line. Accordingly, noise produced on readout, due to non-uniformity in line characteristics to which variations in remanence correspond, is compensated.

The invention itself, both as to its organization, as well as additional objects and advantages thereof will become more readily apparent from a reading of the following description in connection with the accompanying drawings in which:

FIG. 1 is an enlarged, diagrammatic view, partially in block form, of information storage apparatus embodying the invention;

FIG. 2 is a series of waveforms of signals appearing in the apparatus shown in FIG. 1;

FIG. 3 is a series of curves illustrating the magnetostrictive characteristics of certain increments of the information storage line shown in FIG. 1 for one mode of line operation; and FIG. 4 is a series of curves similar to those shown in FIG. 3 for another mode of line operation.

Referring more particularly to FIG. 1, there is shown a base 10 on which the ferroacoustic memory is supported. The memory itself includes a line 12 of material, the permeability of which is a function of stress. In the form of the invention illustrated in FIG. 1 the line 12 is a tube of magnetostrictive material such as nickel, nickel-iron, or nickel-iron-chromium. The tube may be small in diameter and may be of considerable length, for example, two feet long. The outside diameter of the tube may be 0.015 inch. The tube may have a 0.002 inch wall thickness. A series of U-shaped supports 14 of insulating material may be used to hold the tube spaced from the surface of the base 10. Damping pads 16, for example of neoprene or similar synthetic sponge rubber, are disposed around the line 12 near the opposite ends thereof. These pads may be held in place by hold-down plates 18 which are fastened to the base 10 by means of screws 20. A current carrying element in the form of a conductor 22 is threaded along the longitudinal axis of the tube which provides the line 12. This conductor 22 may have an insulating coating. A coil 24 is disposed around the line 12 near one end thereof. This coil 24 and the section of magnetostrictive line material encompassed by the coil define an electromechanical transducer of the magnetostrictive type.

The circuitry associated with the ferroacoustic memory may include a pulse generator 26 which provides pulses at intervals which may be slightly greater than the time required (propagation time) for a mechanical pulse (stress pulse) to travel the length of line 12. Output current pulses from the generator 26 energize the coil 24, and a mechanical pulse is propagated along the line 12 for each current pulse which is generated. The pulses are applied to a variable delay circuit 28, which may be of various types known in the art, such as a monostable multivibrator which provides an output pulse. An output pulse from the generator 26, after a delay in the circuit 28, is applied to a read gate 30 and a write gate 32. A switch 34 connects the conductor 22 either to an input of the write gate 32 or an input of the read gate 30. The gates 30 and 32 may be AND gates.

A control unit 36, operated by an instruction portion of a message, is connected to the variable delay circuit 28 for adjusting the delay provided by that circuit in correspondence with an address for the data in the line 12. For example, the control unit 36 may be a digital to analog converter which converts the instruction code respecting the address to a voltage which varies the delay in the delay circuit 28. This delay may correspond to the time of propagation of the mechanical pulse to a point on the line 12 corresponding to the address of the data. The read gate 30 or the write gate 32 are then enabled so that a data line may be connected to the conductor 22. When the switch 34 is in the read position, the data line is connected to the conductor 22 in coincidence with the arrival of the mechanical pulse at the address for the data to be read out of the device.

Similarly, the data line is connected, through the write gate 32, to the conductor 22 so that the signals representing the data may be stored at the proper address on the line 12. It should be understood by address is meant that increment along the line 12 which provides storage for the particular item of data. This data may be a binary "1" bit or binary "0" bit which respectively may be represented by a magnetized and an unmagnetized increment of the line.

A source of DC voltage 40, the magnitude of which may be varied, is connected to one terminal of the switch 34. This source may be a battery having a potentiometer thereacross. The output curent may be derived from the tap on this potentiometer. Alternatively, the source 40 may be a pulse generator which provides DC pulses of adjustable amplitude.

FIG. 2 illustrates in waveform (b), the output current which may be obtained from the source 40. Waveforms (a) and (c) show an output signal which would appear on the data line, respectively without and with the use of the current from the source 40 in the case where a data bit is stored at a certain address on the line.

Let it be assumed, for purposes of discussion, that a single "1" bit is written on the line 12. The line is highly magnetized at the address for that bit due to the simultaneous application of stress and magnetizing field at that address. However, the magnetizing field, due to the current in the conductor 22 extends over the entire length of the line. Accordingly, the line may be magnetized somewhat in unrecorded portions. Upon readout, a stress pulse resulting from energization of the coil 24 propagates along the line. Due to non-uniformities in the line, the stress pulse produces variations in induction of the line which result in noise in the readout voltage obtained at the output of the read gate 30. This output voltage, including noise, is illustrated in waveform (a) of FIG. 2. This noise is reduced by means of the direct current source 40. The current from the source is polarized, for example negatively as shown in waveform (b) of FIG. 2, to magnetize the line in a direction reverse to the magnetization produced by the current which is applied to the conductor 22, through the write gate 32, during recording. The current is made sufficient to reduce the remanent induction in the unrecorded line portions. The desired current magnitude may vary from line to line. The current depends, among other things, on line dimensions, conductor dimensions and the magnitude of the current which is applied to the conductor during writing.

The readout voltage waveform is shown as waveform (c) in FIG. 2. The voltage representing the data bit is considerably higher in magnitude than the noise components. Accordingly, the signal-to-noise ratio of the output voltage is much increased.

The reverse current and magnetization may be applied either before or after information is recorded in the line. The magnetization characteristics of the line when reverse magnetization is applied after recording (post-bias) is illustrated in FIG. 3. FIG. 4 shows these characteristics for the mode of operation where the reverse magnetization is applied before recording (pre-bias).

Curves $a$, $b$, and $c$ represent the magnetization characteristics of three distinct increments in the line 12. The magnetization curves are different, since the line may not be uniform in each of these increments. For example, the increment represented by curve $a$ is harder to magnetize than the increment represented by curve $b$. Curve $c$ represents the increment at the desired address for a data bit.

During recording, magnetizing field H is applied to the line 12 due to current which passes through the conductor 22. This magnetizing field is effective at increments $a$, $b$ and $c$ of the line. However, the stress pulse also appears at increment $c$. Accordingly, the permeability of increment $c$ is increased. When the stress pulse and field terminate, remanent induction $x$ representing the data bit is stored in increment $c$. However, increments $a$ and $b$ also are magnetized somewhat. The remanent induction due to the magnetizing filed H alone is indicated as $y$ and $z$, respectively, on curves $b$ and $a$. If a stress pulse were propagated along the line 12 for readout purposes, noise components would be produced at the increments represented by curves $a$ and $b$ due to their remanent induction.

After the information is recorded on the line 12, the switch 34 connects the conductor 22 to the source 40, and current for magnetizing the line in a direction opposite to the current direction for recording information on the line is applied to the line. This reverse magnetizing current produces a field H'. This field is just sufficient to demagnetize the unrecorded line increments represented by curves $a$ and $b$. No stress pulses are propagated during the reverse magnetization. The remanent induction of the non-recorded line increments $a$ and $b$ is substantially reduced. It will be observed that the remanent inductions $y'$ and $z'$ are very close to the origin of the B–H axes. On the other hand, the reverse magnetization is not sufficient to substantially reduce the remanent induction of the recorded line increment $c$. The remanent induction of the recorded increment, indicated as $x'$, is substantially greater than the remanent inductions $y'$ and $z'$ in the non-recorded increments of the line 12. Accordingly, when a stress pulse is propagated for readout, the signal-to-noise ratio in the readout voltage is substantially increased.

The curves $a$, $b$ and $c$ in FIG. 4 represent similar increments of the line 12. Before information is recorded in any of these line increments, a current pulse, is applied from the DC source 40 to the conductor. This current pulse produces a magnetizing field $H_p$ which premagnetizes the line. When the field $H_p$ is removed the line increments $a$, $b$, and $c$ are respectively left with different remanent inductions $r$, $s$, and $t$. These remanent inductions may be different due to nonuniformity in the line 12. It is assumed that a data bit is to be recorded at increment $c$. To obtain such recording the write gate 32 is connected to the conductor 22 and is enabled by a data bit and a pulse from the pulse generator 26. The recording current pulse produces a recording field H'' in the direction opposite to the direction of the pre-biasing field $H_p$. A stress pulse is also propagated to increment $c$. Accordingly, during recording, the permeability of increment $c$ is increased. The reverse field H'' is of sufficient magnitude to demagnetize the unrecorded increments $a$ and $b$. These increments $a$ and $b$ are left with very low remanent inductions which lie in the region of the origin of the B–H axes. However, the field H'' magnetizes the increment c and leaves that increment with a remanent induction u which represents the data bit. Since the unrecorded portions of the line have a very low remanent induction and the recorded portion of the line has a high remanent induction, the readout voltage has a high signal-to-noise ratio.

From the foregoing description it will be apparent that there has been provided improved information storage apparatus which, in the disclosed embodiment of the invention may be of the ferroacoustic type. Although a single embodiment of the information storage apparatus and two methods for information storage in accordance with the invention have been disclosed, variations in the apparatus and these methods within the scope of the invention will, undoubtedly become apparent to those skilled in the art. Accordingly, the foregoing description should be taken merely as illustrative and not in any limiting sense.

What is claimed is:

1. The method of information storage with the aid of a signal retentive medium comprising the steps of changing the retentive characteristics of said medium in response to a mechanical signal, storing information in said medium while its said characteristics are being changed in response to an electrical signal, reducing the stored signal level in the portions of said medium in which stored information is absent to a substantially constant level in response to an electrical signal, and then reading out said stored information in response to a mechanical signal.

2. The method of information storage with the aid of a retentive magnetic material comprising the steps of changing the retentivity of said material in response to a mechanical signal, storing information in said medium in response to an electrical signal, minimizing the remanent induction of said material except where said information is stored therein, and then reading out said stored information in response to a mechanical signal.

3. The method of information storage with the aid of a line of magnetostrictive material comprising the steps of propagating a stress pulse along said line, applying a magnetizing field to said line in timed relation to said stress pulse to store information in said line, applying a magnetizing field to said line in a direction opposite to said first named field to reduce noise during read out, and propagating another stress pulse along said line to read out said stored information.

4. The method of ferroacoustic information storage with the aid of a line of magnetostrictive material having a magnetic field producing element inductively linked thereto, said method comprising the steps of propagating a stress pulse along said line, operating said element to produce a magnetic field in timed relation with said stress pulse for storing information in said line, then operating said element to produce a magnetic field in reverse direction to said first named field for minimizing the remanent induction in those portions of said line in which stored information is absent, and thereafter propagating another stress pulse for reading out said stored information.

5. The method of ferroacoustic information storage with the aid of a line of magnetostrictive material having a magnetic field producing element inductively linked thereto, said method comprising the steps of first operating said element for producing a first magnetic field to magnetically bias said line in one direction, then propagating a stress pulse along said line, next operating said element for producing a second magnetic field to magnetize said line in a direction opposite to said first direction and in timed relation to said stress pulse to develop a substantial induction at an increment coincident with the location of stress pulse and substantially reduce the induction at other increments of said line to zero polarization and thereafter propagating another stress pulse along said line for reading out said information.

6. Ferroacoustic information storage apparatus comprising a line of magnetostrictive material, a conductor extending along said line and magnetically linked thereto, a transducer coupled to said line for applying stress pulses thereto which propagate therealong, a pulse generator operatively coupled to said transducer and to said conductor for applying pulses in timed relation thereto whereby to write information on said line, and a source of direct current adapted to be connected to said conductor and polarized to pass current therethrough in a direction opposite to said pulse generator whereby the remanent induction in increments wherein no information is stored is substantially reduced to zero polarization whereby noise is reduced during read-out.

7. Information storage apparatus comprising a signal retentive medium, means for propagating a mechanical signal through said medium for altering the retentivity thereof in successive increments thereof, means responsive to an electrical signal for storing information in selected increments of said medium, and electrical signal responsive means for reducing any signal level retained in said medium except in said selected increments to substantially zero polarization whereby noise is reduced during read out.

8. Information storage apparatus comprising a line of magnetostrictive material, an element adapted to carry a current inductively linked to said line, means for propagating a stress pulse along said line, means for applying current to said line in timed relation to said stress pulse for storing information in said line, and means for applying current to said line in a direction opposite to said first named current applying means for enabling the reduction of remanent induction in said line to substantially zero polarization except where said information is stored.

References Cited

UNITED STATES PATENTS 3,320,596   5/1957   Smith et al. _____ 340—173 X

FOREIGN PATENTS 873,367   7/1961   Great Britain.

BERNARD KONICK, Primary Examiner.

J. F. BREIMAYER, Assistant Examiner.